Feb. 14, 1961

J. N. DETRICK 2,971,708

APPARATUS FOR CUTTING OVER BETWEEN
TAKE-UP REELS FOR A STRAND

Filed Jan. 27, 1960

INVENTOR
J. N. DETRICK

BY J. L. Landis
ATTORNEY

Feb. 14, 1961 J. N. DETRICK 2,971,708
APPARATUS FOR CUTTING OVER BETWEEN
TAKE-UP REELS FOR A STRAND
Filed Jan. 27, 1960 5 Sheets-Sheet 2
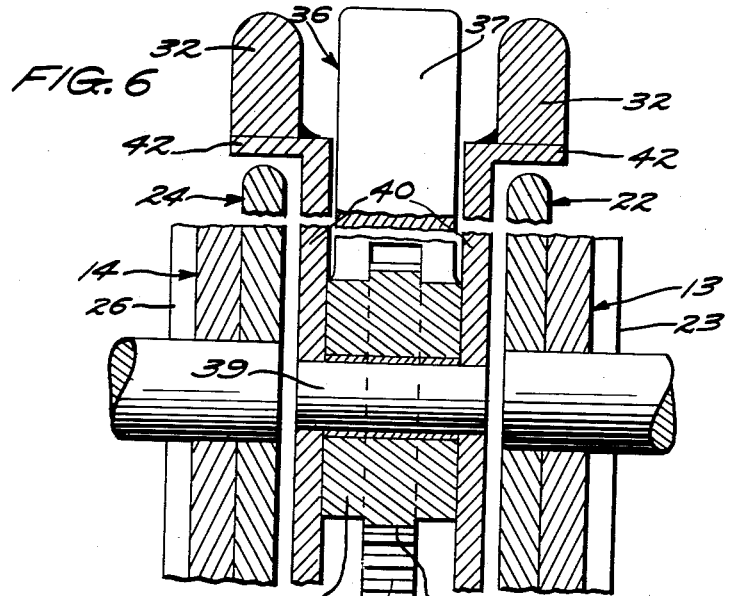
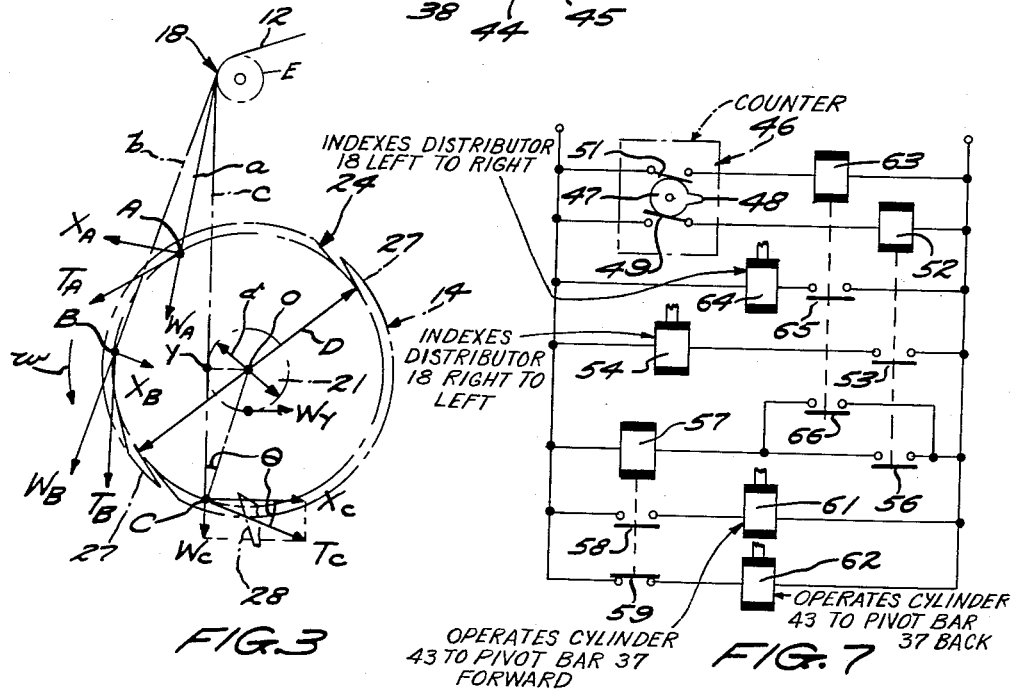
INVENTOR
J. N. DETRICK
BY J. L. Landis
ATTORNEY INVENTOR
J. N. DETRICK
BY J. L. Landis
ATTORNEY

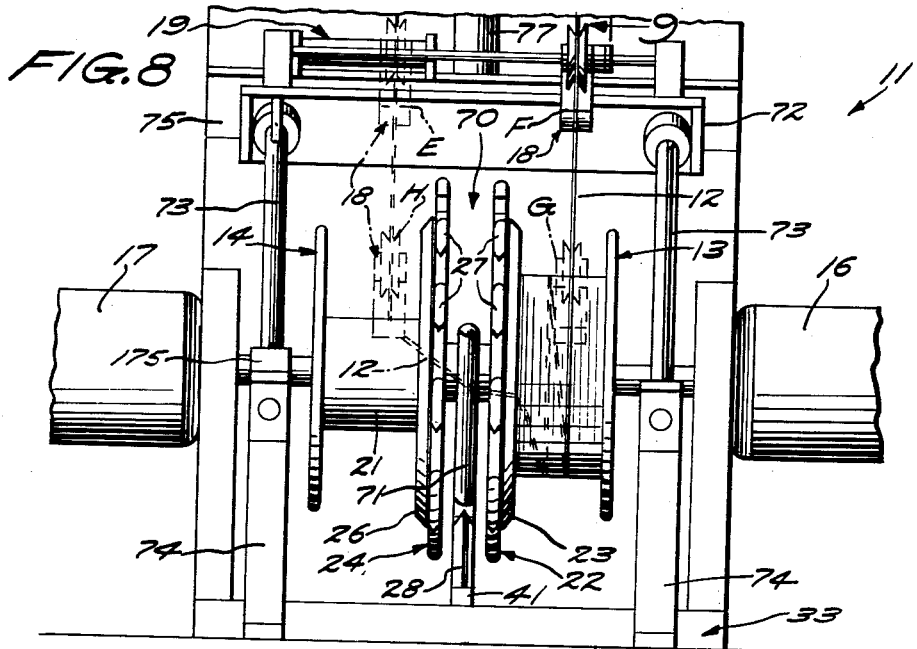
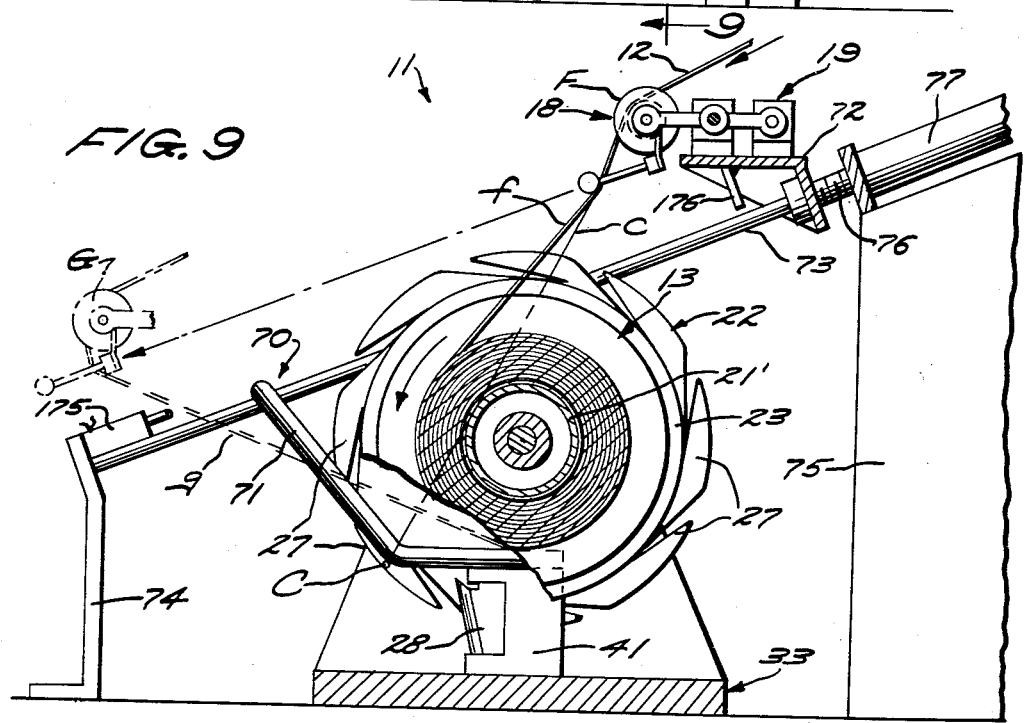

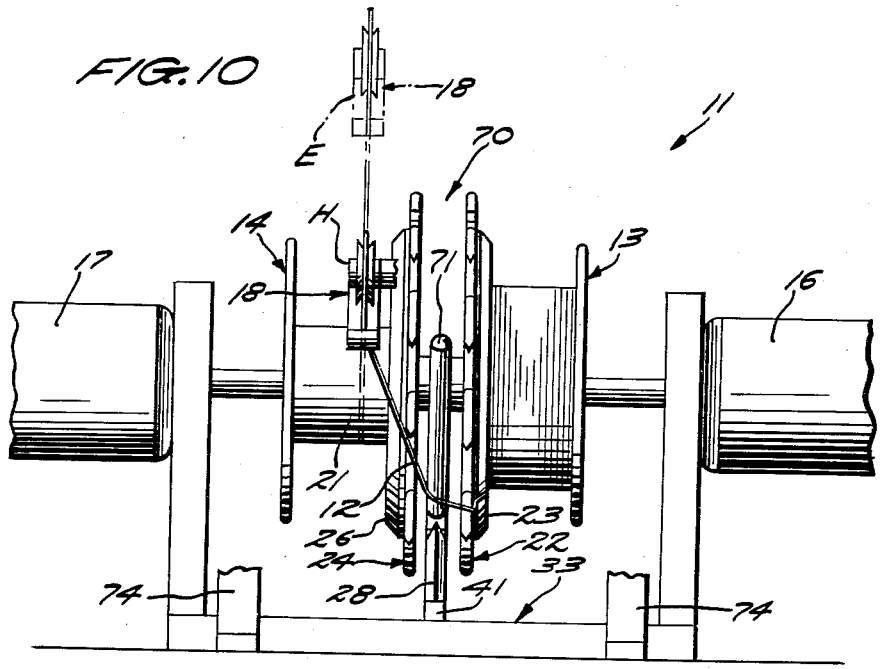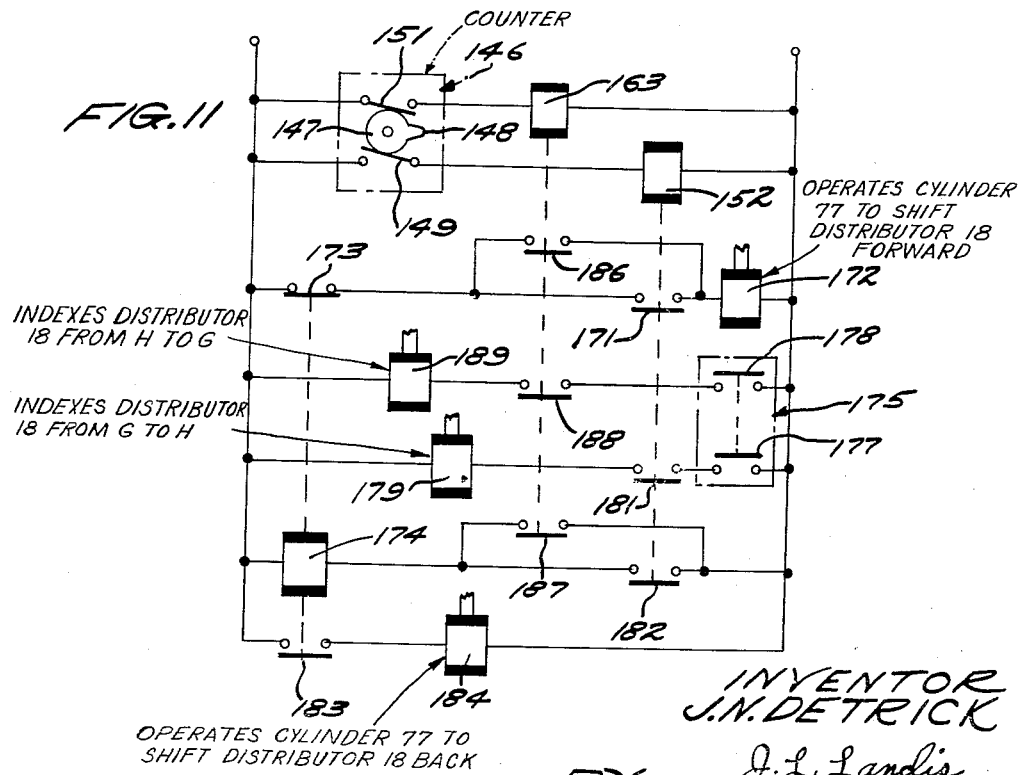

United States Patent Office 2,971,708
Patented Feb. 14, 1961

2,971,708

APPARATUS FOR CUTTING OVER BETWEEN TAKE-UP REELS FOR A STRAND

Judson N. Detrick, Chicago, Ill., assignor to Western Electric Company, Incorporated, New York, N.Y., a corporation of New York Filed Jan. 27, 1960, Ser. No. 5,063

6 Claims. (Cl. 242—25)

The present invention relates generally to apparatus for cutting over between take-up reels for a strand, and more particularly to certain improvements in the automatic cutover mechanisms provided in high-speed reeling installations for wire.

Accordingly, a general object of the invention is to provide new and improved apparatus for cutting over between take-up reels for a strand.

Another object of the invention is to provide improvements in the automatic cutover mechanisms provided in high-speed reeling installations for wire.

In the manufacture of strand and wire, and particularly in the manufacture of insulated wire, it is necessary to provide reeling installations capable of continuously taking up an unbroken length of wire advancing from apparatus such as an extruder at speeds in excess of 2700 feet per minute. It is customary in such installations to provide a pair of spaced, axially aligned, rotary take-up reels, together with a traversing distributor for guiding the advancing wire back and forth across the winding surface of either reel. When one reel is full, or otherwise contains a predetermined length of wire thereon as indicated by a footage counter, the distributor is indexed from a position opposite to the full reel to a position opposite to the other reel, which is empty. In such installations, it is also common practice to provide an automatic cutover mechanism including a pair of toothed snagger plates mounted one for rotation with each reel adjacent to the inner end thereof. The snagger plates are designed to catch and grip the wire extending between the reels after the distributor indexes and to carry the wire across a cutter mounted between the plates to sever the strand so that winding may commence on the empty reel.

More specific objects of the invention are to provide improvements in such cutover mechanisms so as to facilitate the cutover operation and especially so as to snag the wire at preselected points designed to produce a relatively uniform wire speed at all times and to substantially reduce stretching of the wire during the cutover operation.

Still another object resides in the provision of cutover mechanisms which allow the empty reel to be rotated at a speed substantially faster than the full reel.

With the foregoing and other objects in view, an improved cutover apparatus, embodying certain features of the invention, may include means mounted for rotation with an empty reel for snagging a length of wire extending between a full reel and the empty reel as a distributor indexes, and means for guiding the wire into engagement with the snagging means at such a position that a line drawn from the snagging point to the operating position of the distributor when opposite to the empty reel is substantially tangent to the core of the empty reel.

According to a first embodiment of the invention, a stationary curved guide is mounted between the reels and is so arranged that the wire lays over the guide as the distributor indexes and is not engaged immediately by the snagger plates. Means are provided for pushing the wire laying over the guide off of the guide to a position whereafter the wire is engaged by the snagger plates. The guide is further constructed and arranged so that the strand is snagged at a predetermined position with respect to the distributor, preferably the tangent position described previously.

According to a second embodiment of the invention, means are provided for shifting the distributor from a normal rearward distributing position with respect to the full reel to a forward position just prior to the cutover operation, after which the distributor is indexed in the forward position to a point opposite to and forward of the empty reel. A stationary guide is mounted between the reels and is so slanted as to engage the wire extending between the reels as the distributor indexes in the forward position to direct the wire to a predetermined position where it may be engaged by the snagger plates, preferably in the tangent position. After the wire has been snagged, the shifting means are operated in the opposite direction to shift the distributor to the normal rearward distributing position with respect to the empty reel.

Other objects, advantages and features of the invention will be apparent from the following detailed description of specific examples and embodiments thereof, when taken in conjunction with the appended drawings, in which:

Fig. 3 is a diagrammatic view, somewhat similar to Fig. 2, illustrating certain important relationships of the invention;

Fig. 6 is an enlarged fragmentary vertical section, taken generally along the line 6—6 of Fig. 2 and illustrating certain details of construction and mounting of the transfer elements;

Fig. 7 is a schematic representation of a simplified electrical control circuit for operating the apparatus according to the first embodiment of the invention;

Fig. 8 is a fragmentary front elevation of a strand-reeling installation including an improved cutover mechanism according to a second embodiment of the invention;

Fig. 9 is a vertical cross section, taken generally along the line 9—9 of Fig. 8;

Fig. 10 is a front view similar to Fig. 8, but illustrating a later stage in the transfer operation; and Fig. 11 is a schematic representation of a simplified electrical control circuit for operating the apparatus according to the second embodiment of the invention.

Figure 1:
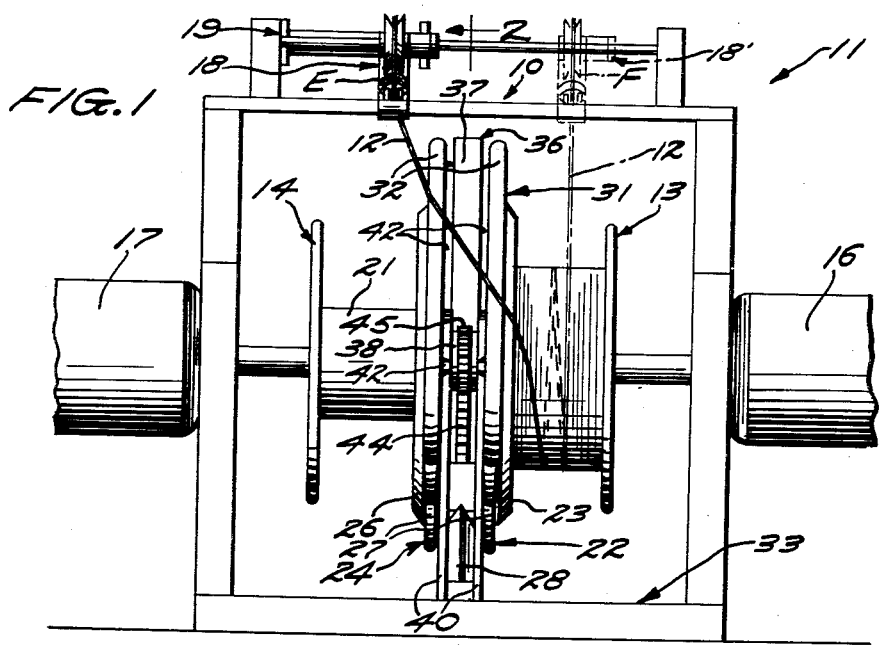
Fig. 1 is a fragmentary front elevation of a strand-reeling installation including an improved cutover mechanism according to a first embodiment of the invention.
Figure 2:
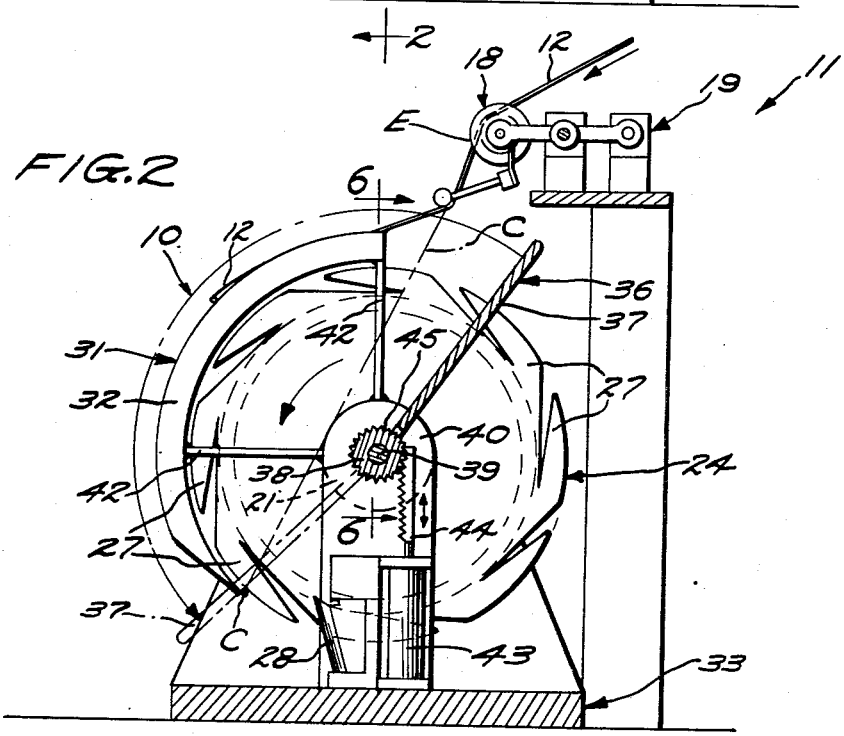
Fig. 2 is a vertical cross section, taken generally along the line 2—2 of Fig. 1 in the direction of the arrows.
Figure 4:
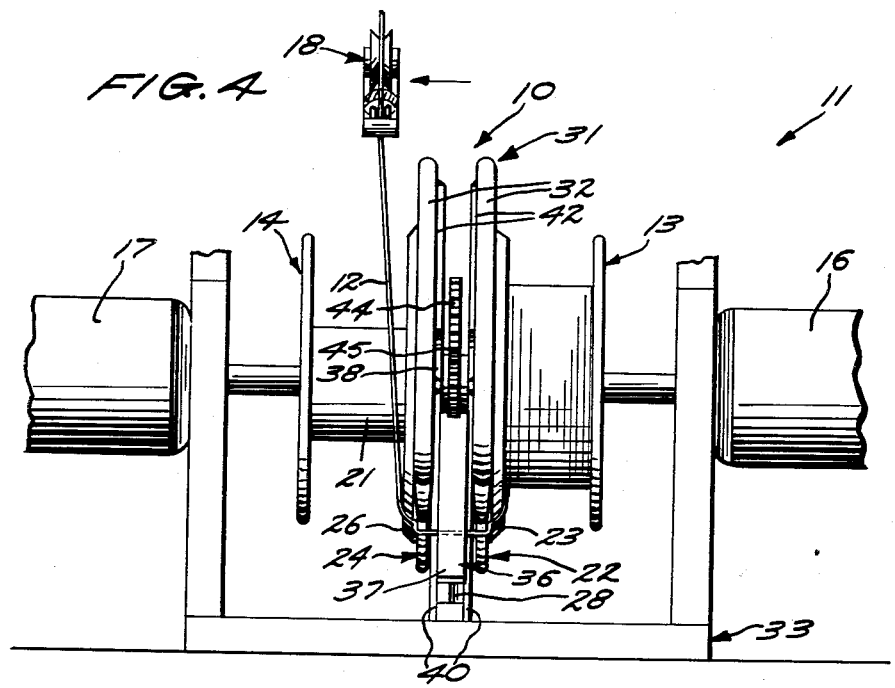
Figs. 4 and 5 are front views similar to Fig. 1, but illustrating successive stages in the transfer operation.

Referring now in detail to the drawings, and in particular to Figs. 1 and 2, a guide mechanism in accordance with a first embodiment of the invention is designated generally by the numeral 10 and is shown in combination with a generally conventional strand-reeling installation designated generally by the numeral 11. The installation 11 is designed for taking up a strand, such as a continuous length of insulated wire 12 being fed at high speed from a plastics extruder by a capstan (not shown), alternately on a pair of take-up reels designated generally by the numerals 13 and 14.

The reels 13 and 14 are mounted in spaced, axially aligned relationship and are rotated, respectively, by a pair of motors 16 and 17. In practice, the operative reel 13 or 14 is always driven at such a rotational speed that the peripheral speed of the winding surface (which is the speed of advancement of the wire by the reels) is substantially equal to the speed of advancement of the wire by the capstan, hereinafter designated as the "line speed," so as to reel in the advancing wire at substantially the same speed that it is being supplied by the capstan.

As the wire 12 builds up on the operative reel, the rotational speed must be continuously decreased so that the peripheral speed of the winding surface remains equal to line speed. For this purpose, the motors 16 and 17 are variable-speed motors and are governed in conventional fashion by an accumulator (not shown) positioned between the capstan and the reels. Whenever the reel tends to rotate too fast, the accumulator takes up slack and closes a switch to slow down the reel; whereas, if the reel tends to rotate too slowly, an excess of slack accumulates and another switch is closed to speed up the reel.

A traversing distributor 18 of any conventional construction is provided for guiding the wire 12 back and forth across the winding surface of the operative take-up reel so that the wire winds in a plurality of layers of closely packed helical turns until the particular reel is filled or otherwise contains a predetermined length of the wire thereon. This condition is usually sensed by a footage counter (not shown in the mechanical drawings) which actuates an indexing mechanism, designated generally by the numeral 19, for moving the distributor 18 to the right or left as viewed in Fig. 1 from a position opposite to the reel which is then full to a position opposite to the reel which is then empty. The indexing mechanism may be of any convenient construction; for example, that disclosed in applicant's copending application with C. R. Hoffman and L. W. Malzahn, Serial No. 642,508, filed February 26, 1957, now U.S. Patent 2,929,569, issued March 22, 1960. In Fig. 1 of the drawings, it should be assumed that the reel 13 has just been filled with a predetermined length of the wire 12 (to a diameter approximately twice that of a core 21 of the empty reel 14), and the distributor 18 has been indexed or cut over from right to left from a phantom-line position F opposite to the full reel 13 to a solid-line position E opposite to the empty reel 14 in preparation for the beginning of winding on that reel.

In order to enable automatic cutover between the reels, the full reel 13 is equipped with a generally circular snagger plate designated generally by the numeral 22 which is releasably mounted on an inner reel flange 23 and for rotation therewith. The empty reel 14 is similarly equipped with a snagger plate 24 mounted on an inner flange 26 thereof. The snagger plates 22 and 24 are alike and, as viewed in Fig. 2, each plate includes a plurality of snagger teeth 27—27 extending beyond the periphery of the inner flanges 23 and 26 and projecting in the direction of rotation of the associated reel. The snagger plates 22 and 24 are designed to catch and grip the length of wire 12 extending between the reels at some time after the distributor 18 has been indexed from the full reel position F to the empty reel position E.

A cutter 28 is mounted between the reels 13 and 14 and is designed to sever the wire gripped by the snagger plates 22 and 24 as the snagger plates carry the wire therepast. After the wire has been cut, the empty-reel snagger plate 24 still grips the wire and carries the cut wire end in a counterclockwise direction as viewed in Fig. 2 around the empty reel 14 whereby, shortly after the cutting operation, the wire wraps around the core 21 of the empty reel and begins to wind thereon in conventional fashion.

In conventional reeling installations of the character described, the wire 12 is snagged by the empty-reel snagger plate 24 at the approximate point designated by the letter "A" in Fig. 3, which point is near the upper surface of the reel and is spaced approximately 180° around the reel 14 from the cutter 28. After the wire has been engaged by one of the teeth 27—27 of the empty-reel snagger plate 24, the speed of advancement of the wire 12 to the reels is determined by the speed and position of the operative snagger tooth 27.

Considering now the schematic illustration, Fig. 3, the peripheral speed of that portion of the snagger tooth 27 that grips the strand at the point A is represented by the character "$T_A$" and is equal to $\pi D \omega$, wherein D is the diameter across the snagger plate 24 at the point where the wire is gripped and $\omega$ is the rotational speed of the reel 14. The peripheral speed $T_A$ is a vector which may be resolved into two right-angle components, $W_A$ and $X_A$, the component $W_A$ being along the instantaneous line of advancement "$a$" of the wire 12 and the component $X_A$ being perpendicular thereto. The line of advancement "$a$" is determined by drawing a straight line from the snagging point A to the distributor 18. It has been calculated that only the in-line component $W_A$ tends to advance the wire at any time, so that the wire speed at the point A is equal to the vector $W_A$.

As the operative snagger tooth 27 rotates further and carries the wire 12 to a horizontal point B, the wire line is indicated by the dashed line $b$ and the wire speed has been increased substantially to the vector quantity $W_B$. The tangential velocity $T_B$ is equal to the vector $T_A$ previously mentioned because the rotational speed remains constant, but the wire speed vector $W_B$ is larger because of the change in the angle of the wire line.

When the operative snagger tooth 27 has rotated still further to a point C where the wire 12 is tangent to the core 21 of the empty reel 14, the wire line is indicated by the letter "$c$" and the wire 12 is just about to begin wrapping about the core 21 of the empty reel 14. At the point C, the wire-speed component $W_C$ of the tangential velocity $T_C$ has been reduced to a relatively small value as compared to the speeds $W_A$ and $W_B$. The wire speed $W_C$ is equal to $T_C \sin \theta$, wherein $T_C$ is the peripheral speed of the snagging point at the point C and wherein $\theta$ is the acute angle indicated in Fig. 3 which is defined between the vectors $X_C$ and $T_C$.

In Fig. 3 the letter "Y" designates a point on the periphery of the empty-reel core 21 and along the line $c$ that the wire 12 begins to wrap on the core 21, the letter "O" designates the center of the reel 14, and the letter "$d$" designates the diameter of the core 21. Considering now the right triangle OCY, the acute angle OCY is equal to the angle $\theta$ since the triangle OCY is similar to the triangle defined by the vectors $T_C$, $X_C$ and $W_C$. Thus, $$\sin \theta = \frac{d/2}{D/2} = d/D$$

Since $W_C = T_C \sin \theta$, since $T_C = \pi D \omega$, and since $\sin \theta = d/D$, it is apparent that $W_C = \pi d \omega$. However, the speed of advancement $W_Y$ of the wire 12 when winding on the empty-reel core 21 is also equal to $\pi d \omega$, since that is the peripheral speed of the core 21, so that the wire speed imparted by the operative snagging tooth 27 at the point C is equal to the wire speed $W_Y$ when the wire 12 begins winding on the empty reel 14.

According to the principles of the present invention, it is proposed to snag the wire 12 extending between the reels 13 and 14 as the distributor 18 indexes at such a point (C) that a line ($c$) drawn from the snagging point C to the operating position (E) of the distributor 18 when opposite to the empty reel 14 is substantially tangent to the core 21 of the empty reel 14. When this is done, the speed of advancement of the wire 12 to the empty reel 14 is substantially constant during the entire cutover operation and there is substantially no shock or stretching force imparted to the wire during the cutover operation.

The rotational speed $\omega$ of the empty reel 14 is preferredly such that the peripheral speed of the core 21 ($W_Y$) is substantially equal to the speed that the wire 12 was being wound on the full reel 13 prior to the cut-over operation (the line speed). With this arrangement, the speed of advancement of the wire 12 to the reels 13 and 14 is substantially constant during the entire reeling operation. Assuming that the winding diameter of the full reel 13 is approximately double the diameter of the bare core 21, this step requires that the empty reel 14 be rotated at approximately double the speed of the full reel 13 just before cutover.

Since, as indicated previously, the snagger plate 24 will not snag the wire 12 at the point C if the distributor 18 is merely indexed in conventional fashion from the point F to the point E, positive steps are taken to direct the wire out of its normal path to such a position that it is snagged at the point C. According to the principles of the invention, the step of snagging the wire at the point C is accomplished by guiding the length of wire extending between the reels 13 and 14 into engagement with the snagger plate 24 at the point C.

It is apparent that this step may be accomplished manually by grasping the wire 12 extending between the reels as the distributor indexes, holding the wire away from the snagger plates 22 and 24 so as to avoid engagement at the point A, and then moving the wire downward and inward as viewed in Fig. 3 to a position where it is snagged at the point C. However, it is preferred to provide suitable automatic mechanisms for guiding the wire into engagement with the snagging plates at the tangent position described.

*First embodiment*

A first specific guide mechanism 10 for practicing the invention automatically is illustrated in Figs. 1, 2 and 4 to 7. This apparatus includes a stationary curved guide designated generally by the numeral 31 that is mounted between the reels 13 and 14 so that the wire 12 lays over the guide 31, as viewed in Fig. 1, as the distributor 18 indexes from the position F opposite to the full reel 13 to the position E opposite to the empty reel 14. The guide 31 holds the wire 12 away from the snagger plates 22 and 24 so that the wire is not immediately engaged thereby.

While the guide 31 might be constructed in one piece, the guide 31 is preferably composed of two identical curved guide plates 32—32 that are mounted fixedly to a support designated generally by the numeral 33. Each of the guide plates 32—32 covers an associated one of the snagger plates 22 and 24 (as shown in Figs. 1 and 6) so as to engage the wire 12 being indexed and to preclude the wire from contacting the rotating snagger plates 22 and 24. The guide plates 32—32 project in the direction of rotation of the reels 13 and 14 (in a counterclockwise direction as viewed in Fig. 2) and terminate at points in horizontal alignment with the point C.

A mechanism is provided, designated generally by the numeral 36, for pushing the wire 12 laying over the guide 31 when the distributor 18 indexes off of that guide at a position where the wire is engaged by the snagger plates 22 and 24 in predetermined positions with respect to the distributor 18. Specifically, the predetermined positions of snagging are in alignment with the point C for the reasons previously described.

Figure 5:
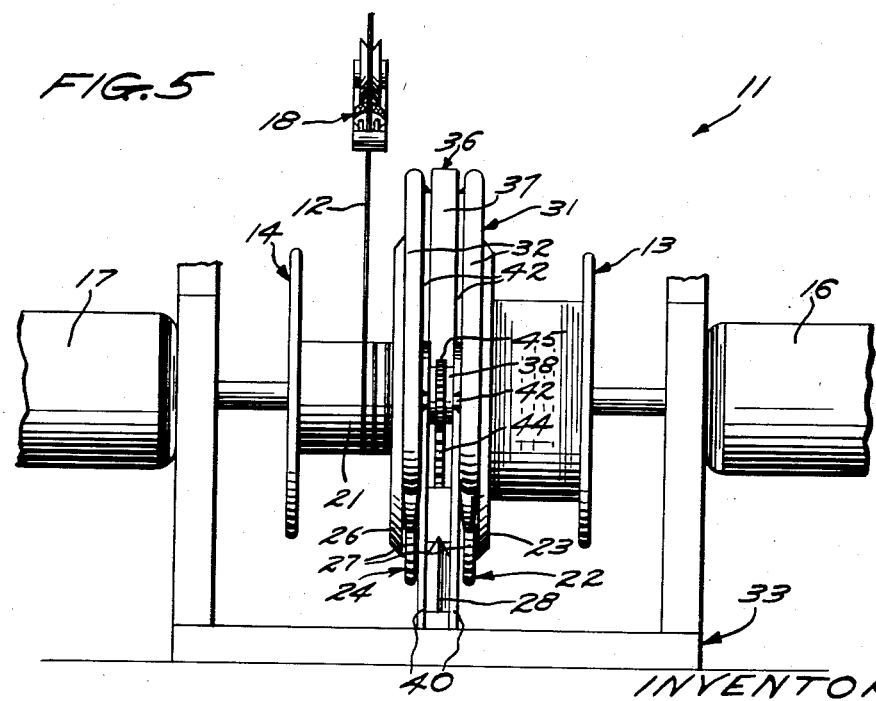

In the specific embodiment illustrated, the pushing means 36 includes a pushing member or bar 37 mounted on the support 33 for pivoting about the center line of the reels. The bar 37 is normally positioned in an upper position illustrated in solid lines in Figs. 1 and 2 where it is behind the distributor 18 and thus is out of the path of the wire 12 as the wire is transferred between the reels 13 and 14. Shortly after the distributor 18 has been indexed, the bar 37 is pivoted forward (in a counterclockwise direction as indicated in Fig. 2) from the solid line position illustrated in Fig. 2 to a phantom line position illustrated in phantom lines in Fig. 2 and in solid lines in Fig. 4. As the bar 37 moves forward, it engages the length of wire 12 extending between the reels 13 and 14 and pushes the same in a counterclockwise direction around the curved guide plates 32—32 and off of the free ends thereof so that the wire is snagged by both snagger plates 22 and 24 at the point C. After the wire 12 has been cut and winding has commenced on the empty reel 14, the bar 37 is pivoted back to the normal position as indicated in Fig. 5.

While various mountings may be provided for the bar 37, in the specific embodiment illustrated the bar 37 is formed with a hollow shaft 38 at the inner end thereof that is rotatably received on a fixed pin 39 as best seen in Figs. 2 and 6. The pin 39 is secured at opposite ends to a pair of thin standards 40—40 that extend upward from the support 33 in the space between the reels 13 and 14. Each of the guide plates 32—32 is mounted to an associated one of the standards 40—40 by a pair of supporting arms 42—42 that are mounted to the standards and are bent outward, as illustrated in Fig. 6, to support the guide plate 32—32 beyond the associated one of the snagger plates 22 and 24 and in alignment therewith.

The bar 37 is pivoted forward by means of an air cylinder 43 (Fig. 2), which has a rack 44 affixed to its piston rod and which is mounted on the support 33. The rack 44 meshes with a pinion gear 45 formed as an integral part of the shaft 38 so as to move the bar 37 forward when the rack 44 moves upward, as viewed in Fig. 2, and to return the bar to its normal position when the rack 44 moves downward.

A simplified control circuit is illustrated in Fig. 7, which includes a footage counter designated generally by the numeral 46. The counter 46 includes a cam 47 that rotates slowly in proportion to the amount of wire taken up at any time. The cam 47 is formed with a lobe 48 that alternately operates a pair of switches 49 and 51 when it is time to cut over between the reels 13 and 14. When the switch 49 is closed, a first control relay 52 is energized to close a contact 53 thereof and thus energize a solenoid 54, which is a part of the indexing mechanism 19 and operates to move the distributor 18 from right to left as viewed in Fig. 1.

The relay 52 also closes a contact 56 thereof to energize a timing relay 57. After a predetermined short time delay required to allow complete indexing of the distributor 18, the timing relay 57 closes a normally open contact 58 thereof and opens a normally closed contact 59. As the contact 58 closes, a solenoid 61 is energized to actuate the air cylinder 43 to pivot the pushing bar 37 forward to enable snagging and cutting of the wire 12.

After another short time (during which winding has begun on the empty reel 14), the cam lobe 48 permits the switch 49 to reopen, thus de-energizing the relay 52, the solenoid 54 and the timing relay 57. As the timing relay 57 de-energizes, the contact 58 is reopened and the contact 59 is reclosed. As the contact 59 is reclosed, a solenoid 62 is energized to operate the air cylinder 43 in the opposite direction so as to move the bar 37 back to its normal position in preparation for the next transfer operation.

On the next transfer operation, the cam lobe 48 closes the other switch 51 to energize a second operating relay 63 and a solenoid 64 through a contact 65 of the relay 63. The solenoid 64 is a part of the indexing mechanism 19, and functions to index the distributor from left to right as viewed in Fig. 1. The relay 63 also closes a contact 66 thereof, which is in parallel with the contact 56 previously described, to again energize the timing relay 57 and operate the pushing bar 37.

*Second embodiment*

A second apparatus embodying the principles of the invention is illustrated in Figs. 8 to 11, and includes a different form of guide means, designated generally by the numeral 70, for guiding the wire 12 into engagement with the snagger plates 22 and 24 at the point C. In Figs. 8 and 9, the distributor 18 is shown at a normal distributing position F with respect to the full reel 13 just prior to the cutover operation.

During the cutover operation, the distributor is moved along a compound path, to be described, to a normal distributing position E with respect to the empty reel 14. The positions E and F are in horizontal alignment as viewed in Fig. 9, and are somewhat to the rear of a vertical line drawn through the centers of the reels 13 and 14 so as to feed the wire 12 to the reels 13 and 14 along the approximate lines $f$ (for the full reel 13) and $c$ (for the empty reel 14) just before and just after the transfer operation. In Fig. 9, the numeral 21' designates the core of the full reel 13, which is in direct horizontal alignment with the empty reel core 21.

Shortly before a cutover operation is to be instituted, the distributor 18 is shifted from the normal distributing position F to a forward position G where the wire 12 is fed to the reel 13 along the modified line $g$ indicated in Fig. 9. The distributor 18 is indexed, in the forward position, from the position G opposite to the full reel 13 to a forward position H, which is opposite to the empty reel 14 and is in direct horizontal alignment with the position G. This position is approximately as illustrated in solid lines in Fig. 10.

A stationary guide bar 71 is mounted between the reels 13 and 14 and is so slanted, as viewed in Fig. 9, as to engage the wire 12 extending between the reels 13 and 14 as the distributor 18 indexes in the forward position to direct the wire 12 into engagement with the snagger plates 22 and 24 at predetermined positions with respect to the distributor 18. Preferably, the outer surface of the guide bar 71 crosses the circle defined by the snagger teeth 27—27 at the point C so as to enable snagging at that point for the reasons described hereinbefore. After the snagging operation, the distributor 18 is shifted from the forward position H with respect to the empty reel 14 to the normal distributing position E, and winding commences in conventional fashion on the core 21 of the empty reel.

One specific mechanism for shifting the distributor 18 in the manner described is illustrated in Figs. 8 and 9, wherein the distributor 18 and the indexing mechanism 19 therefor are mounted on a carriage 72 for movement of the distributor 18 to the left and right, as viewed in Fig. 8, on the carriage 72. The entire carriage 72 is slidably mounted on a pair of inclined guide rods 73—73 so that the carriage 72 may be shifted along the inclined path illustrated in Fig. 9. The guide rods 73—73 are secured at their left ends, as viewed in Fig. 9, on a pair of standards 74—74 and at their right ends to a supporting member 75. The carriage 72 is connected to the piston rod 76 of a fluid cylinder 77 which operates to shift the carriage 72 downward along the rods 73—73, and thus to shift the distributor 18 from the position F to the position G.

A control circuit for operating the apparatus just described is illustrated in Fig. 11, and includes a footage counter 146 that is similar to the counter 46 of the first embodiment and has a corresponding cam 147 for operating a pair of switches 149 and 151, which alternately energize a pair of control relays 152 and 163. When the relay 152 is energized, it initiates the transfer operation from right to left, as viewed in Figs. 8 and 10, in the following manner: (1) the relay 152 closes a first contact 171 thereof to energize a solenoid 172 through a normally closed contact 173 of a timing relay 174; (2) the solenoid 172 operates the fluid cylinder 77 (Fig. 9) to shift the distributor 18 from the normal distributing position F to the forward position G; (3) as this occurs, a limit switch 175 (which is mounted on one of the standards 74—74 as shown in Fig. 9) is operated by an actuator lever 176 (which is secured to the under surface of the carriage 72 as shown in Fig. 9 in alignment with the switch 175 so as to operate that switch when the distributor 18 has been shifted to the forward position) to close a pair of contacts 177 and 178; (4) closure of the contact 177 energizes a solenoid 179 of the indexing mechanism 19 through a second, now-closed contact 181 of the control relay 152 to index the distributor 18 from the forward position G opposite to the reel 13 to the forward position H opposite to the reel 14; (5) the timing relay 174, which has been energized through the closure of a third contact 182 of the operating relay 152, then opens the normally closed contact 173 thereof to de-energize the solenoid 172 and closes a normally open contact 183 thereof to energize a solenoid 184; and then (6) the solenoid 184 operates the fluid cylinder 77 in the opposite direction to shift the distributor 18 from the forward position H to the normal distributing position E above the empty reel 14.

When the transfer is to be from left to right as viewed in Figs. 8 and 10, the operation is the same except that the cam 147 operates the second control relay 163 instead. The relay 163 closes a contact 186 thereof (which parallels the contact 171 of the relay 152) to energize the solenoid 172 for the purpose previously described and also closes a contact 187 thereof (which parallels the contact 182 of the relay 152) to energize the timing relay 174 as described. The relay 163 also closes a contact 188 thereof, which energizes a solenoid 189 after the upper contact 178 of the switch 175 closes indicating that the carriage 72 has been shifted to the forward position. The solenoid 189 is a part of the indexing mechanism 19 and controls the indexing of the distributor 18 from left to right.

While various specific examples and embodiments of the invention have been described in detail hereinabove, it will be obvious that various modifications may be made from the specific details described without departing from the spirit and scope of the invention.

What is claimed is:

1. In a strand-reeling installation of the type including a pair of rotary take-up reels for alternately taking up a strand, and a strand distributor which is indexed from a position opposite to a full reel to a position opposite to an empty reel when it is desired to cut over between the reels; an improved cutover apparatus, which comprises means mounted for rotation with the empty reel for snagging the strand extending between the reels as the distributor indexes, and means for guiding the strand into engagement with said snagging means at such a position that a line drawn from the snagging point to the operating position of the distributor when opposite to the empty reel is substantially tangent to the core of the empty reel.

2. In combination with a strand-reeling installation of the type including a pair of spaced, axially aligned, rotary take-up reels; a traversing distributor for guiding a strand to either reel, the distributor being indexed from a position opposite to a full reel to a position opposite to an empty reel when it is desired to cut over between the reels; a pair of toothed snagger plates mounted one for rotation with each reel adjacent to the inner end thereof, the snagger plates being designed to catch and grip the strand extending between the reels after the distributor indexes from the full reel to the empty reel; and a cutter mounted between the reels so as to sever the strand gripped by the snagger plates: an improved cutover mechanism, which includes means for guiding the length of strand extending between the reels during the cutover operation into engagement with the snagger plates at such a position that a line drawn from the snagging point by the empty-reel snagger plate to the operating position of the distributor when opposite to the empty reel is substantially tangent to the core of the empty reel.

3. In combination with a strand-reeling installation of the type including a pair of spaced, axially aligned, rotary take-up reels; a traversing distributor for guiding a strand to either reel, the distributor being indexed from a position opposite to a full reel to a position opposite to an empty reel when it is desired to cut over between the reels; a pair of toothed snagger plates mounted one for rotation with each reel adjacent to the inner end thereof, the snagger plates being designed to catch and grip the strand extending between the reels after the distributor indexes from the full reel to the empty reel; and a cutter mounted between the reels so as to sever the strand gripped by the snagger plates: an improved cutover mechanism, which includes a stationary curved guide mounted between the reels and so arranged that the strand lays over said guide as the distributor indexes from the full reel to the empty reel and is not engaged immediately by the snagger plates, and means for pushing the strand laying over said guide off of said guide whereafter the strand is engaged by the snagger plates, said guide being further constructed and arranged so that the strand is snagged at a predetermined position with respect to the distributor.

4. In combination with a strand-reeling installation of the type including a pair of spaced, axially aligned, rotary take-up reels; a traversing distributor for guiding a strand to either reel, the distributor being indexed from a position opposite to a full reel to a position opposite to an empty reel when it is desired to cut over between the reels; a pair of toothed snagger plates mounted one for rotation with each reel adjacent to the inner end thereof, the snagger plates being designed to catch and grip the strand extending between the reels after the distributor indexes from the full reel to the empty reel; and a cutter mounted between the reels so as to sever the strand gripped by the snagger plates: an improved cutover mechanism, which includes a pair of stationary curved guide plates mounted in spaced parallel relationship to each other beyond the peripheries of the snagger plates so that one guide plate covers a portion of each snagger plate, whereby the strand lays over said guide plates as the distributor indexes from the full reel to the empty reel and is not engaged immediately by the snagger plates, said guide plates projecting in the direction of rotation of said reels and terminating at aligned points where a pair of lines drawn from the points of termination of said guide plates to the distributor when opposite to the respective reels are substantially tangent to the cores of the reels, a pushing bar mounted for movement in the space between said guide plates and normally positioned out of engagement with the strand, and means operable after the indexing movement of the distributor for moving said pushing member into engagement with the strand laying over said guide plates so as to push the strand off of said guide plates whereafter the strand is engaged by the snagger plates.

5. In combination with a strand-reeling installation of the type including a pair of spaced, axially aligned, rotary take-up reels; a traversing distributor for guiding a strand to either reel, the distributor being indexed from a position opposite to a full reel to a position opposite to an empty reel when it is desired to cut over between the reels; a pair of toothed snagger plates mounted one for rotation with each reel adjacent to the inner end thereof, the snagger plates being designed to catch and grip the strand extending between the reels after the distributor indexes from the full reel to the empty reel; and a cutter mounted between the reels so as to sever the strand gripped by the snagger plates: an improved cutover mechanism, which includes means for shifting the distributor from a normal rearward distributing position with respect to the full reel to a forward position just prior to the cutover operation, after which the distributor is indexed in the forward position to a point opposite to and forward of the empty reel; and a stationary guide mounted between the reels and so slanted as to engage the strand extending between the reels as the distributor indexes in the forward position to direct the strand to a predetermined position where it may be engaged by the snagger plates, said shifting means being operated in the opposite direction after the strand has been snagged to shift the distributor to the normal rearward distributing position with respect to the empty reel.

6. In combination with a strand-reeling installation of the type including a pair of spaced, axially aligned, rotary take-up reels; a traversing distributor for guiding a strand to either reel, the distributor being indexed from a position opposite to a full reel to a position opposite to an empty reel when it is desired to cut over between the reels; a pair of toothed snagger plates mounted one for rotation with each reel adjacent to the inner end thereof, the snagger plates being designed to catch and grip the strand extending between the reels after the distributor indexes from the full reel to the empty reel; and a cutter mounted between the reels so as to sever the strand gripped by the snagger plates: an improved cutover mechanism, which includes means for shifting the distributor from a normal rearward distributing position with respect to the full reel to a forward position just prior to the cutover operation, after which the distributor is indexed in the forward position to a point opposite to and forward of the empty reel; and a sloping guide bar mounted fixedly between the reels and sloping inward toward the reels at its lower end so that the strand extending between the reels as the distributor indexes in the forward position rides over and down said guide bar to a position where it may be engaged by the snagger plates, said guide bar being so arranged with respect to the normal rearward position of the distributor with respect to the empty reel that a line drawn from the point of snagging by the empty-reel snagger plate to the distributor in its normal position is substantially tangent to the core of the empty reel, said shifting means being operated in the opposite direction after the strand has been snagged to shift the distributor to the normal distributing position with respect to the empty reel.

References Cited in the file of this patent

UNITED STATES PATENTS

| | | |
|---|---|---|
| 2,546,637 | Robson | Mar. 27, 1951 |
| 2,626,111 | Hanson | Jan. 20, 1953 |
| 2,779,545 | Hauck et al. | Jan. 29, 1957 |